(12) United States Patent
Zhang et al.

(10) Patent No.: US 11,375,491 B2
(45) Date of Patent: Jun. 28, 2022

(54) CONTROL INFORMATION TRANSMISSION METHOD AND APPARATUS

(71) Applicant: Huawei Technologies Co., Ltd., Shenzhen (CN)

(72) Inventors: Xingwei Zhang, Lund (SE); Chao Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 40 days.

(21) Appl. No.: 16/785,070

(22) Filed: Feb. 7, 2020

(65) Prior Publication Data
US 2020/0178229 A1 Jun. 4, 2020

Related U.S. Application Data

(63) Continuation of application No. PCT/CN2018/099715, filed on Aug. 9, 2018.

(30) Foreign Application Priority Data

Aug. 9, 2017 (CN) .......................... 201710675184.5

(51) Int. Cl.
H04W 72/04 (2009.01)
H04L 1/00 (2006.01)
H04L 1/18 (2006.01)
H04W 80/02 (2009.01)
H04W 88/06 (2009.01)

(52) U.S. Cl.
CPC ......... *H04W 72/042* (2013.01); *H04L 1/0004* (2013.01); *H04L 1/1819* (2013.01); *H04W 80/02* (2013.01); *H04W 88/06* (2013.01)

(58) Field of Classification Search
CPC ... H04W 72/042; H04L 1/0004; H04L 1/1819
See application file for complete search history.

(56) References Cited

U.S. PATENT DOCUMENTS 10,051,618 B2 * 8/2018 Gho ...................... H04L 5/0053
2009/0116490 A1 * 5/2009 Charpentier ............ H04L 69/32
370/395.1
(Continued)

FOREIGN PATENT DOCUMENTS

CN 102340800 A 2/2012
WO 2013105832 A1 7/2013
(Continued)

OTHER PUBLICATIONS

Huawei, et al., "On enabling and disabling of wider bandwidth in FeMTC," 3GPP TSG RAN WG1 Meeting #86bis, R1-1608622, Lisbon, Portugal, Oct. 10-14, 2016, 2 pages.
(Continued)

Primary Examiner — Charles C Jiang
Assistant Examiner — Ryan C Kavleski
(74) Attorney, Agent, or Firm — Conley Rose, P.C.

(57) ABSTRACT

A control information transmission method and an apparatus related to the field of communications technologies include receiving first control information, where the first control information includes M unit lengths, and N unit lengths of the M unit lengths are effective unit lengths, $0 \leq N < M$, and both M and N are integers, and determining information carried in the N effective unit lengths.

20 Claims, 5 Drawing Sheets

(56) References Cited

U.S. PATENT DOCUMENTS

| | | |
|---|---|---|
| 2012/0230291 A1 | 9/2012 | Han et al. |
| 2012/0236812 A1* | 9/2012 | Chen ................... H04W 72/042 |
| | | 370/329 |
| 2013/0051356 A1* | 2/2013 | Hong ................... H04L 27/2602 |
| | | 370/329 |
| 2015/0063231 A1 | 3/2015 | Seo et al. |
| 2015/0195069 A1 | 7/2015 | Yi et al. |
| 2015/0358996 A1* | 12/2015 | Fang ................... H04W 72/1278 |
| | | 370/280 |
| 2016/0204838 A1 | 7/2016 | Park et al. |
| 2018/0288750 A1 | 10/2018 | Yu et al. |
| 2018/0332566 A1 | 11/2018 | You et al. |
| 2019/0037058 A1* | 1/2019 | Asterjadhi ............ H04L 5/0091 |
| 2021/0143932 A1* | 5/2021 | Xu ......................... H04W 4/80 |

FOREIGN PATENT DOCUMENTS

| | | |
|---|---|---|
| WO | 2015007152 A1 | 1/2015 |
| WO | 2017014549 A1 | 1/2017 |
| WO | 2017091992 A1 | 6/2017 |

OTHER PUBLICATIONS

Duoduo Hu, "PDCCH blind detection", Dec. 5, 2013, with partial english translation, 4 pages.

\* cited by examiner

CONTROL INFORMATION TRANSMISSION METHOD AND APPARATUS

CROSS-REFERENCE TO RELATED APPLICATION

This application is a continuation of International Patent Application No. PCT/CN2018/099715 filed on Aug. 9, 2018, which claims priority to Chinese Patent Application No. 201710675184.5 filed on Aug. 9, 2017. The disclosures of the aforementioned applications are hereby incorporated by reference in their entireties.

TECHNICAL FIELD

This application relates to the field of communications technologies, and in particular, to a control information transmission method and an apparatus.

BACKGROUND

Compared with a Long-Term Evolution (LTE) system, a fifth generation (5G) communications system can dynamically configure more information using downlink control information (DCI), for example, dynamically configure a modulation and coding scheme (MCS). This inevitably causes relatively high DCI overheads. Therefore, a related parameter of the DCI may be configured using semi-static signaling such as radio resource control (RRC) signaling. For example, a length of the DCI, some fields included in or some fields not included in the DCI, a quantity of fields included in the DCI, and the like are configured in specific duration using the RRC signaling. However, the 5G communications system is in a research and development design phase, which does not currently relate to a related design in which the related parameter of the DCI configured using the semi-static signaling is inconsistent with information that actually needs to be carried using the DCI.

SUMMARY

This application provides a DCI transmission method and an apparatus to resolve a problem that a DCI related parameter configured using semi-static signaling is inconsistent with information that actually needs to be carried using DCI.

According to a first aspect, this application provides a control information transmission method and an apparatus.

In a possible design, the method may include receiving first control information, where the first control information includes M unit lengths, N unit lengths are effective unit lengths, $0 \leq N < M$, and both M and N are integers, and then determining information carried in the N effective unit lengths. Optionally, remaining (M−N) unit lengths are ineffective unit lengths. The first control information may be, for example, but is not limited to DCI. In this technical solution, the first control information includes the M unit lengths. The M unit lengths may be preset, and certainly are not limited thereto. Setting the N unit lengths therein to be effective unit lengths helps resolve a problem that preconfigured first control information is inconsistent with actually transmitted first control information.

In a possible design, the method may further include any one of the following steps to determine the N effective unit lengths. Certainly, this application is not limited thereto. A status of each of the M unit lengths is determined to obtain the N effective unit lengths. The status of the unit length is used to indicate that the unit length is an effective unit length or a redundant unit length. Alternatively, statuses of the M unit lengths are sequentially determined. If one of the M unit lengths is determined as a redundant unit length, unit lengths before or after the unit length are determined as the N effective unit lengths. The status of the unit length is used to indicate that the unit length is the effective unit length or the redundant unit length. Alternatively, a value of N is determined, and the N effective unit lengths are obtained at preset locations in the M unit lengths. Alternatively, if information carried in a plurality of unit length sets in the M unit lengths is the same or has a mapping relationship, unit lengths in any unit length set are used as the N effective unit lengths. The unit length set may include at least one unit length. For specific implementations of the several technical solutions, refer to the following specific implementations.

In a possible design, the method may further include receiving second control information, where the second control information is used to indicate the value of N. The second control information may be, for example, but is not limited to, RRC signaling, media access control (MAC) signaling, or DCI. The first control information and the second control information may be the same control information, or may be different control information. This possible design provides a manner of configuring the value of N.

In a possible design, the method may further include receiving third control information, where the third control information is used to indicate a value of M. The third control information may be, for example, but is not limited to, RRC signaling, MAC signaling, or DCI. This possible design provides a manner of configuring the value of M using signaling indication. This is not limited in the implementation. For example, the value of M may be alternatively set using a protocol.

Correspondingly, a control information transmission apparatus is provided. The apparatus can implement the control information transmission method in the first aspect. For example, the apparatus may be a terminal, and the apparatus can implement the foregoing method using software or hardware, or by executing corresponding software by hardware.

In a possible design, the apparatus may include a processor and a memory. The processor is configured to support the apparatus in performing corresponding functions in the method in the first aspect. The memory is configured to be coupled to the processor, and store a necessary program instruction and necessary data of the apparatus. In addition, the apparatus may further include a communications interface configured to support communication between the apparatus and another network element. The communications interface may be a transceiver.

In a possible design, the apparatus may include a transceiver unit and a processing unit. The transceiver unit is configured to receive first control information. The first control information includes M unit lengths, N unit lengths are effective unit lengths, $0 \leq N < M$, and both M and N are integers. The processing unit is configured to determine information carried in the N effective unit lengths.

In a possible design, the processing unit may be further configured to perform any one of the following steps to determine the N effective unit lengths. Certainly, this application is not limited thereto. A status of each of the M unit lengths is determined to obtain the N effective unit lengths. The status of the unit length is used to indicate that the unit length is an effective unit length or a redundant unit length. Alternatively, statuses of the M unit lengths are sequentially determined. If one of the M unit lengths is determined as a redundant unit length, unit lengths before or after the unit length are determined as the N effective unit lengths. The status of the unit length is used to indicate that the unit length is the effective unit length or the redundant unit length. Alternatively, a value of N is determined, and the N effective unit lengths are obtained at preset locations in the M unit lengths. Alternatively, if information carried in a plurality of unit length sets in the M unit lengths is the same or has a mapping relationship, unit lengths in any unit length set are used as the N effective unit lengths. The unit length set includes at least one unit length.

In a possible design, the transceiver unit is further configured to receive second control information, and the second control information is used to indicate a value of N.

In a possible design, the transceiver unit is further configured to receive third control information, and the third control information is used to indicate a value of M.

According to a second aspect, this application provides another control information transmission method and an apparatus.

In a possible design, the method may include generating first control information, where the first control information includes M unit lengths, N unit lengths are effective unit lengths, 0≤N<M, and both M and N are integers, and then sending the first control information.

In a possible design, the method may further include sending second control information, where the second control information is used to indicate a value of N.

In a possible design, the method may further include sending third control information, where the third control information is used to indicate a value of M.

Correspondingly, a control information transmission apparatus is provided. The apparatus can implement the control information transmission method in the second aspect. For example, the apparatus may be a network device, and the apparatus can implement the foregoing method using software or hardware, or by executing corresponding software by hardware.

In a possible design, the apparatus may include a processor and a memory. The processor is configured to support the apparatus in performing a corresponding function in the method in the second aspect. The memory is configured to be coupled to the processor, and store a necessary program instruction and necessary data of the apparatus. In addition, the apparatus may further include a communications interface configured to support communication between the apparatus and another network element. The communications interface may be a transceiver.

In a possible design, the apparatus may include a processing unit and a transceiver unit. The processing unit is configured to generate first control information. The first control information includes M unit lengths, N unit lengths are effective unit lengths, 0≤N<M, and both M and N are integers. The transceiver unit is configured to send the first control information.

In a possible design, the transceiver unit is further configured to send second control information, and the second control information is used to indicate a value of N.

In a possible design, the transceiver unit is further configured to send third control information, and the third control information is used to indicate a value of M.

In a possible design, according to any technical solution of the second aspect, a status of each of the M unit lengths is used to indicate that the unit length is an effective unit length or a redundant unit length. Alternatively, a status of one of the M unit lengths is a redundant state, and is used to indicate that a unit length before or after the unit length is an effective unit length. Alternatively, N unit lengths at preset locations in the M unit lengths are effective unit lengths. Alternatively, information carried in a plurality of unit length sets in the M unit lengths is the same or has a mapping relationship. The unit length set includes at least one unit length.

According to any one of the technical solutions in the first aspect or the second aspect, the M unit lengths carry a same type of information. Optionally, the type of information carried in the M unit lengths includes at least one of MCS, a new data indicator (NDI), a redundancy version (RV), resource information, antenna information, coordinated multipoint transmission/reception (CoMP) information, hybrid automatic repeat request (HARQ) information, a reference signal indicator, power control information, a measurement trigger, a multi-carrier indicator, timing information, and an initial access parameter.

According to a third aspect, this application provides another control information transmission method and an apparatus.

In a possible design, the method may include receiving fourth control information, where the fourth control information is used to indicate a value of a quantity N of effective unit lengths included in first control information, and N≥0, and then performing blind detection based on the value of N to receive the first control information. The fourth control information may be, for example, but is not limited to, RRC signaling, MAC signaling, or DCI. In this technical solution, the fourth control information indicates a possible value of the quantity of effective unit lengths included in the first control information. In this way, it is helpful to control an actual quantity of blind detection times of a terminal within a blind detection capability of the terminal. For an analysis process, refer to the foregoing descriptions. Details are not described herein again.

Correspondingly, a control information transmission apparatus is provided. The apparatus can implement the control information transmission method in the third aspect. For example, the apparatus may be a terminal, and the apparatus can implement the foregoing method using software or hardware, or by executing corresponding software by hardware.

In a possible design, the apparatus may include a processor and a memory. The processor is configured to support the apparatus in performing a corresponding function in the method in the third aspect. The memory is configured to be coupled to the processor, and store a necessary program instruction and necessary data of the apparatus. In addition, the apparatus may further include a communications interface configured to support communication between the apparatus and another network element. The communications interface may be a transceiver.

In a possible design, the apparatus may include a transceiver unit and a processing unit. The transceiver unit is configured to receive fourth control information. The fourth control information is used to indicate a value of a quantity N of effective unit lengths included in first control information, and N≥0. The processing unit is configured to perform blind detection based on the value of N to receive the first control information.

According to a fourth aspect, this application provides another control information transmission method and an apparatus.

In a possible design, the method may include receiving fifth control information, where the fifth control information is used to indicate a blind detection parameter of first control information and performing blind detection based on the blind detection parameter of the first control information to receive the first control information, where the first control information may be, for example, but is not limited to DCI, the first control information includes N effective unit lengths, and N≥0. The fifth control information may be, for example, but is not limited to, RRC signaling, MAC signaling, or DCI. In this technical solution, the fifth control information is used to indicate the blind detection parameter of the first control information such that it is helpful to control an actual quantity of blind detection times of a terminal within a blind detection capability of the terminal.

Correspondingly, a control information transmission apparatus is provided. The apparatus can implement the control information transmission method in the fourth aspect. For example, the apparatus may be a terminal, and the apparatus can implement the foregoing method using software or hardware, or by executing corresponding software by hardware.

In a possible design, the apparatus may include a processor and a memory. The processor is configured to support the apparatus in performing a corresponding function in the method in the fourth aspect. The memory is configured to be coupled to the processor, and store a necessary program instruction and necessary data of the apparatus. In addition, the apparatus may further include a communications interface configured to support communication between the apparatus and another network element. The communications interface may be a transceiver.

In a possible design, the apparatus may include a transceiver unit and a processing unit. The transceiver unit is configured to receive fifth control information. The fifth control information is used to indicate a blind detection parameter of first control information. The processing unit is configured to perform blind detection based on the blind detection parameter of the first control information to receive the first control information. The first control information includes N effective unit lengths, and N≥0.

In a possible design, according to any technical solution provided in the fourth aspect, the blind detection parameter of the first control information includes at least one of a length, a time-frequency resource location, an aggregation level (AL), a quantity of carriers, a quantity of beams, a quantity of transmission points, a quantity of resource sets, and a quantity of bandwidths of the first control information.

According to a fifth aspect, this application provides another control information transmission method and an apparatus.

In a possible design, the method may include generating first control information, where the first control information includes N effective unit lengths, N is determined in a data transmission mode, N≥0, and N is an integer and sending the first control information. In this technical solution, N is determined in the data transmission mode. That is, the length of the first control information may vary. For related descriptions of the data transmission mode, refer to the following specific implementations. Details are not described herein again.

In a possible design, the method may further include sending fourth control information, where the fourth control information is used to indicate a value of N.

In a possible design, the method may further include sending fifth control information, where the fifth control information is used to indicate a blind detection parameter of first control information. For related description of the blind detection parameter, refer to the foregoing descriptions. Details are not described herein again.

Correspondingly, a control information transmission apparatus is provided. The apparatus can implement the control information transmission method in the fifth aspect. For example, the apparatus may be a network device, and the apparatus can implement the foregoing method using software or hardware, or by executing corresponding software by hardware.

In a possible design, the apparatus may include a processor and a memory. The processor is configured to support the apparatus in performing a corresponding function in the method in the fifth aspect. The memory is configured to be coupled to the processor, and store a necessary program instruction and necessary data of the apparatus. In addition, the apparatus may further include a communications interface configured to support communication between the apparatus and another network element. The communications interface may be a transceiver.

In a possible design, the apparatus may include a processing unit and a transceiver unit. The processing unit is configured to generate first control information, where the first control information includes N effective unit lengths, N is determined in a data transmission mode, N≥0, and N is an integer. The transceiver unit is configured to send the first control information.

In a possible design, according to the method or the apparatus provided in any one of the foregoing aspects, the unit length includes one of one or more bits and one or more fields. The unit length includes the effective unit length and the redundant unit length. The effective unit length is a unit length carrying effective information. Information carried in the redundant unit length may be redundant information, or may be repeated information of the effective information, information that has a mapping relationship with the effective information, or the like. A status of the unit length is used to indicate that the unit length is the effective unit length or the redundant unit length.

This application further provides a computer storage medium. The computer storage medium stores a computer program instruction. When the program instruction is run on a computer, the computer is enabled to perform the method in any one of the foregoing aspects.

This application further provides a computer program product. When the computer program product is run on a computer, the computer is enabled to perform the method in any one of the foregoing aspects.

This application further provides a chip system. The chip system includes a processor configured to support a terminal in implementing the method in any one of the foregoing aspects, for example, generating or processing data and/or information in the foregoing method. In a possible design, the chip system further includes a memory, and the memory is configured to store a necessary program instruction and necessary data of a network device. The chip system may include a chip, or may include a chip and another discrete component.

It may be understood that any apparatus, computer storage medium, computer program product, or chip system provided above is configured to perform a corresponding method provided in the foregoing description. Therefore, for a beneficial effect that can be achieved by any apparatus, computer storage medium, computer program product, or chip system, refer to a beneficial effect in a corresponding method. Details are not described herein again.

DESCRIPTION OF EMBODIMENTS

The technical solutions provided in this application may be applied to various communications systems, for example, an existing communications system, a 5G communications system, a future evolved system, or a plurality of communications convergence systems. There may be a plurality of application scenarios, for example, a scenario such as machine to machine (M2M), device to machine (D2M), macro-micro communication, enhanced mobile broadband (eMBB), ultra-reliable low-latency communication (uRLLC), and massive machine-type communications (mMTC). These scenarios may include but are not limited to a scenario of communication between a terminal and a terminal, a scenario of communication between a network device and a network device, a scenario of communication between a network device and a terminal, and the like. Alternatively, the technical solutions provided in this application may be applied to a scenario of communication between a terminal and a terminal, a scenario of communication between a network device and a network device, or the like in a 5G communications system.

Figure 1:
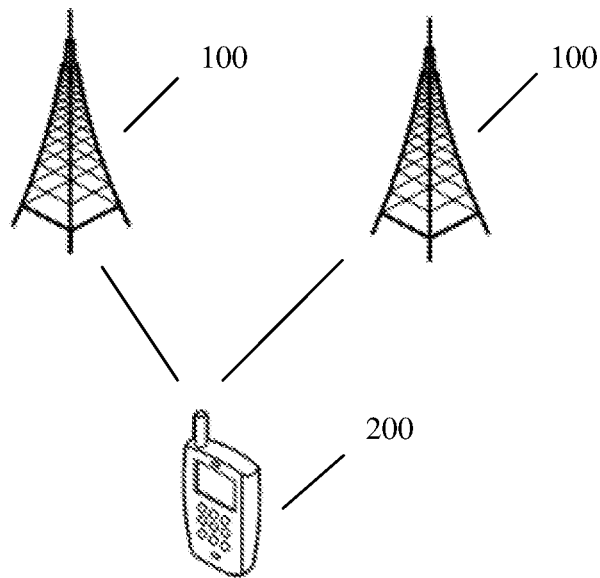
FIG. 1 is a schematic diagram of a system architecture applicable to a technical solution according to an embodiment of this application.

FIG. 1 is a schematic diagram of a communications system applicable to a technical solution according to this application. The communications system may include a network device 100 and one or more terminals 200 (only one terminal is shown) connected to the network device.

The network device 100 may be a device that can communicate with the terminal 200. The network device 100 may be a transmission reference point (TRP), a base station, a relay station, an access point, or the like. The network device 100 may be a base transceiver station (BTS) in a Global System for Mobile Communications (GSM) or code-division multiple access (CDMA) network, or may be a NodeB (NB) in a wideband CDMA (WCDMA), or may be an evolutional NB (eNB or eNodeB) in an LTE system. Alternatively, the network device 100 may be a radio controller in a cloud radio access network (CRAN) scenario. Alternatively, the network device 100 may be a network device in a 5G communications system or a network device in a future evolved network, or may be a wearable device, a vehicle-mounted device, or the like.

The terminal 200 may be referred to as user equipment (UE), an access terminal, a UE unit, UE station, a mobile station, a mobile console, a remote station, a remote terminal, a mobile device, UE terminal, a terminal, a wireless communications device, UE agent, UE apparatus, and or the like. The access terminal may be a cellular phone, a cordless phone, a Session Initiation Protocol (SIP) phone, a wireless local loop (WLL) station, a personal digital assistant (PDA), a handheld device having a wireless communications function, a computing device, another processing device connected to a wireless modem, an in-vehicle device, a wearable device, a terminal device in a future 5G network, or a terminal device in a future evolved public land mobile network (PLMN), and or the like.

The following describes related technologies and terms in this application to facilitate understanding of a reader.

(1) Information Carried in DCI:

Information carried on a physical downlink control channel (PDCCH) is DCI. The DCI may carry, for example, but is not limited to, some information such as resource allocation information and a modulation and demodulation scheme of a physical downlink shared channel (PDSCH), and physical uplink shared channel (PUSCH).

One piece of DCI may carry one or more types of information, and types of information carried in different pieces of DCI may be the same or may be different. A type of information carried in the DCI includes, for example without limitation to, at least one of MCS, an NDI, an RV, resource information (for example, time domain, frequency domain, space domain, code domain, and power information of a resource), antenna information (for example, an antenna port, a beam index, a quantity of beams, and a codebook), CoMP information (for example, a coordinated mode), HARQ information (for example, a HARQ process number and a quantity of retransmission times), a reference signal indication, power control information, a measurement trigger, a multi-carrier indication, timing information, and an initial access parameter. Certainly, the DCI may further carry other information, for example without limitation to, a carrier indicator field or a preamble index.

(2) A Time-Frequency Resource for Carrying DCI:

There is a plurality of radio frames in time domain, and each radio frame includes 10 milliseconds (ms). One radio frame includes 10 subframes, and a length of each subframe is 1 ms. For a 15 kilohertz (kHz) subcarrier spacing, one subframe includes two slots, each slot is 0.5 ms. A quantity of symbols included in a slot is related to a length of a cyclic prefix (CP) of a symbol. For a normal CP (NCP), one slot includes seven symbols. For an extended CP (ECP), one slot includes six symbols. The "symbol" herein may be an orthogonal frequency division multiplexing (OFDM) symbol. The DCI is usually transmitted on the first, first two, or first three OFDM symbols of a subframe.

A resource element (RE) is a smallest time-frequency RE. An RE may be uniquely identified by an index for (k, l), where k is a subcarrier index, and l is a symbol index. One RE group (REG) includes, for example without limitation to, 12 consecutive REs (an RE occupied by a reference signal is not included in the 12 consecutive REs).

A basic unit of the time-frequency resource for carrying the DCI is a control channel element (CCE). One CCE includes, for example without limitation to, six REGs. The DCI may be transmitted using different ALs. An AL means a quantity of CCEs carried in the DCI. The AL may be, for example, but is not limited to, 1, 2, 4, 8, 16, 32, or the like. For example, the AL 2 means two CCEs carried in the DCI.

(3) A Length and a Configuration of DCI:

One piece of DCI may include one or more bits. Lengths of different pieces of DCI may be the same or may be different. One field, for example, an MCS field or an RV field, may include one or more consecutive bits of one piece of DCI.

In an implementation, the length of the DCI may be preconfigured. For example, the length of the DCI is configured using a protocol, or a length, of the DCI, in a period of time is configured using signaling such as RRC signaling or MAC signaling. In this application, an actual length of the DCI may be the same as or different from the preconfigured length of the DCI.

In another implementation, types of information carried in the DCI or types of information not carried in the DCI may be preconfigured. A quantity of each of one or more types of carried information is configured. For example, the DCI is preconfigured to carry four MCS fields. For another example, the DCI is preconfigured to carry no RV field. The pre-configuration may be, for example, performed using a protocol, or signaling such as RRC signaling or MAC signaling.

(4) A Unit Length, an Effective Unit Length, and a Redundant Unit Length:

In this application, a concept of the unit length is introduced. The unit length may be, for example, but is not limited to, one of one or more bits and one or more fields. For example, the unit length is two bits, or one MCS field, or one RV field. Quantities of bits occupied by unit lengths that carry different types of information may be the same or may be different. For example, one MCS field occupies five bits, and one RV field occupies one bit.

The unit length includes the effective unit length and the redundant unit length. Information carried in the effective unit length is effective information. Information carried in the redundant unit length may be redundant information, or may be repeated information of the effective information, information that has a mapping relationship with the effective information, or the like. A status of the unit length is used to indicate that the unit length is the effective unit length or the redundant unit length. In some implementations, a terminal may first determine, in DCI, a unit length that is an effective unit length and a unit length that is a redundant unit length, and then parse information carried in the effective unit length. In some other implementations, a terminal may first obtain, through parsing, information carried in some or all unit lengths in DCI, and then determine a unit length that is an effective unit length and a unit length that is a redundant unit length. For a specific example, refer to the following specific implementations.

(5) Status of a Unit Length:

In some embodiments of this application, a concept of the status of the unit length is introduced. A quantity of possible status of a unit length is related to a quantity of bits occupied by the unit length. The following uses an example for description. If a unit length occupies five bits, there are 32 (that is, $2^5$) possible statuses of the unit length in total. The 32 statuses may be represented as a binary number from 00000 to 11111 (including 00000 and 11111), that is, a decimal number from 0 to 31 (including 0 and 31). The following uses the decimal number as an example for description. During actual transmission, each status of the unit length is one of the 32 statuses.

In some embodiments of this application, the status of the unit length includes an effective state and an invalid state. During actual transmission, each status of the unit length may be either of the effective state and the invalid state. Statuses of any two unit lengths may be the same or may be different.

In some implementations, a terminal may learn of, by detecting a status of the unit length, whether the unit length is an effective unit length or a redundant unit length. Details are as follows. If the status of the unit length is the effective state, it indicates that the unit length is the effective unit length, or if the status of the unit length is the redundant state, it indicates that the unit length is the redundant unit length. A status indicating an effective state and a status indicating a redundant state may be preset, for example, may be preset using a protocol, or using signaling. It should be noted that implementations of determining the effective unit length and the redundant unit length are not limited thereto. For a specific example, refer to the following specific implementations.

(6) Blind Detection:

As described above, the DCI may be transmitted on the first one to three symbols of a subframe and the DCI may be transmitted at different ALs. However, because a terminal does not learn of a specific location of the DCI on a time-frequency resource in advance, and does not learn of an AL of the DCI, the terminal needs to attempt, by performing blind detection, on a possible time-frequency resource location and a possible AL that are of the DCI, to receive the DCI.

To reduce complexity of blind detection of the terminal, two types of search spaces are defined in the LTE system, respectively a terminal-dedicated search space and a common search space. In the terminal-dedicated search space, an AL of the DCI may be 1, 2, 4, or 8. In the common search space, an AL of the DCI may be 4 or 8. As shown in Table 1, if $M^{(L)}$ is used to indicate a quantity of blind detection times when the AL is L, it is specified in the LTE system that for the terminal-dedicated search space, when L={1, 2, 4, 8}, $M^{(L)}$ is separately {6, 6, 2, 2}, and for the common search space, when L={4, 8}, $M^{(L)}$ is separately {4, 2}.

TABLE 1

| Search space | | | Quantity of blind |
|---|---|---|---|
| Type | AL (L) | Search space size | detection times ($M^{(L)}$) |
| Terminal-dedicated search space | 1 | 6 | 6 |
| | 2 | 12 | 6 |
| | 4 | 8 | 2 |
| | 8 | 16 | 2 |
| Common search space | 4 | 16 | 4 |
| | 8 | 16 | 2 |

A unit of a size of the search space is a quantity of CCEs.

It can be learned from Table 1 that, when the terminal receives a DCI length, a maximum quantity of blind detection times is 22. In the LTE system, a maximum of two DCI lengths need to be detected. Therefore, a maximum quantity of blind detection times is 44. Although a standard has not been determined, in a new radio (NR) system, the quantity of blind detection times is limited to a maximum quantity of times, and the limitation is, for example, but is not limited to, related to a capability of the terminal (for example, a maximum quantity of blind detection times supported by the terminal). It can be learned from Table 1 that the quantity of blind detection times is associated with a type of a DCI length, an AL, and the like. In some extension scenarios such as carrier aggregation or multi-antenna transmission, the quantity of blind detection times is further related to at least one of a quantity of carriers, a quantity of beams, a quantity of transmission points, a quantity of resource sets, and a quantity of bandwidths.

(7) Other Terms:

The term "a plurality of" in this application means two or more. The term "and/or" in this application describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects. In this application, the terms "first", "second", and so on are intended to distinguish between different objects but do not indicate a particular order of the objects.

The following describes a control information transmission method provided in this application with reference to the accompanying drawings.

Figure 2:
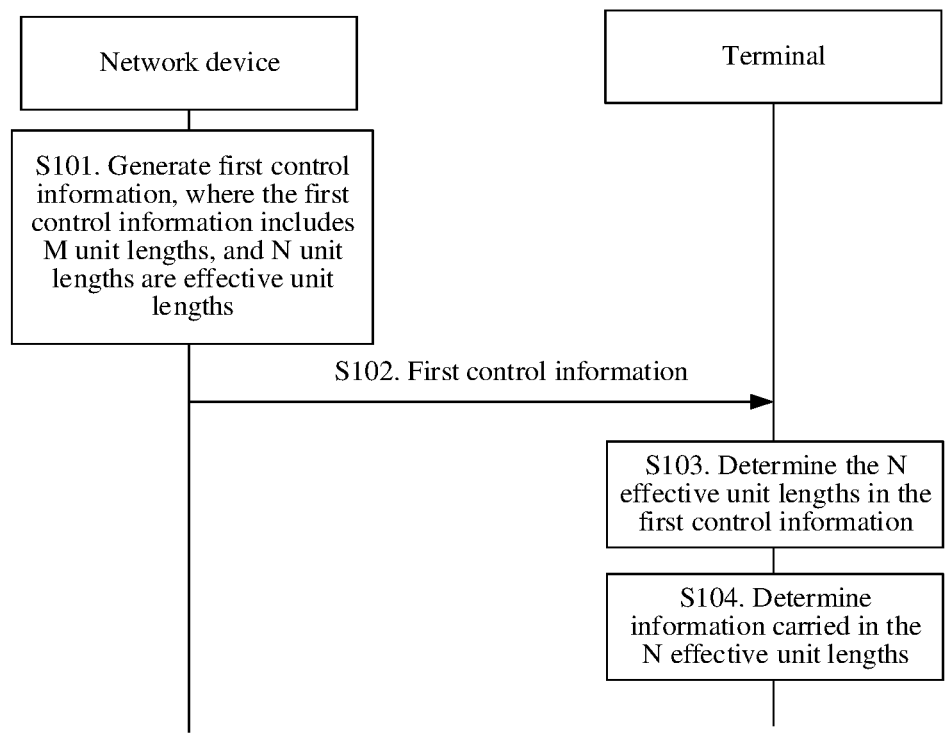
FIG. 2 is a schematic interaction diagram of a control information transmission method according to an embodiment of this application.

FIG. 2 is a schematic interaction diagram of a control information transmission method according to this application.

Step S101. A network device generates first control information, where the first control information includes M unit lengths, N unit lengths are effective unit lengths, 0≤N<M, and both M and N are integers.

The first control information may be, for example, but is not limited to DCI. The DCI is used as an example for description in the following specific examples.

Optionally, the M unit lengths carry a same type of information. For specific descriptions of an information type, refer to the foregoing descriptions. It can be understood that the first control information may further include other information in addition to the information carried in the M unit lengths. For details, refer to the foregoing descriptions.

In some implementations of this application, a value of M may be preset. Optionally, effective duration of the value of M may be preset. The first control information sent each time within the effective duration includes the M unit lengths. For example, the network device and a terminal may preconfigure the value of M using a protocol. In addition, the network device may preconfigure the value of M for the terminal using signaling such as RRC signaling or MAC signaling. The effective duration may indicate that the signaling is sent by the network device to the terminal, or may indicate that a message other than the signaling is sent by the network device to the terminal, or may be preset duration. The effective duration is not limited in this application. It can be understood that the terminal may determine a length of the first control information within the effective duration based on the signaling, to perform blind detection to receive the first control information.

When M>0, it indicates that the first control information is preconfigured to carry a corresponding unit length. For example, if a unit length is an MCS field, when M>0, it indicates that the first control information is preconfigured to carry the MCS field.

When N=0, it indicates that the first control information does not carry the unit length during actual transmission. For example, if the unit length is the MCS field, when N=0, it indicates that the first control information does not carry the MCS field during actual transmission.

When N>0, it indicates that the first control information carries the N unit lengths during actual transmission. For example, if the unit length is the MCS field, when N>0, it indicates that the first control information carries N MCS fields during actual transmission.

Optionally, other (M−N) unit lengths (or referred to as remaining (M−N) unit lengths) in the M unit lengths are redundant unit lengths. It should be noted that the remaining (M−N) redundant unit lengths may be set to carry ineffective information, or information carried in the remaining (M−N) redundant unit lengths may be set to be the same as or have a mapping relationship with information carried in the N effective unit lengths. For a specific example and a beneficial effect, refer to the following descriptions.

Step S102. The network device sends the first control information, and the terminal receives the first control information.

Step S103. The terminal determines the N effective unit lengths in the first control information.

Step S104. The terminal determines the information carried in the N effective unit lengths. Subsequently, the terminal may perform a corresponding control operation based on the information. For a specific implementation process, refer to other approaches.

Steps S101 to S104 may be considered as one DCI transmission method procedure.

In this embodiment, the first control information sent by the network device includes the M unit lengths, and the M unit lengths may be preset. The N unit lengths in the M unit lengths are set to be effective unit lengths. This helps resolve a problem that the preconfigured first control information is inconsistent with actually transmitted first control information. That is, this helps resolve a problem that related information of the preconfigured first control information is inconsistent with information carried in the actually transmitted first control information.

In some implementations of this application, to enable the terminal to determine the N effective unit lengths after the terminal receives the first control information, this application provides the following several design solutions, and correspondingly provides implementations of step S103.

Design solution 1: A status of each of the M unit lengths is used to indicate that the unit length is an effective unit length or a redundant unit length. In this case, step S103 may include that the terminal determines the status of each of the M unit lengths to obtain the N effective unit lengths. The status of each of the M unit lengths may be an effective state or a redundant state. Statuses of any two unit lengths may be the same or may be different.

For example, it is assumed that a unit length is an MCS field, and each MCS field occupies five bits. That is, there are a total of 32 possible statuses of information carried in the MCS field, and the 32 statuses may be represented as decimal numbers from 0 to 31 (including 0 and 31). In addition, 0 to 28 are preset to be effective states, and 29 to 31 are preset to be redundant states. Therefore, if M=4, and the terminal obtains, through parsing, statuses of four unit lengths are successively 1, 30, 3, 31, it can be learned, according to a situation in which "0 to 28 are the effective states, and 29 to 31 are the redundant states", that the first and third unit lengths are effective unit lengths, and the second and fourth unit lengths are redundant unit lengths.

It can be learned from the foregoing example that the terminal may not obtain a value of N before performing step S103. In this way, after obtaining the status of each of the M unit lengths through parsing, the terminal may learn of one or more effective unit lengths, and may learn of the value of N. Certainly, the terminal may alternatively obtain the value of N before performing step S103. For example, the network device indicates the value of N in the first control information, or indicates the value of N to the terminal using another piece of control information (for example, the other piece of control information includes but is not limited to the DCI). In this way, after determining the N effective unit lengths in the M unit lengths, the terminal may not continue to parse a subsequent unit length. For example, in the foregoing example, the terminal learns that N is 2, and after parsing status of the first to third unit lengths and determining that the first and third unit lengths are effective unit lengths, the terminal may learn that there is no effective unit length subsequently. Therefore, the terminal may not continue to parse the fourth unit length. In this way, calculation by the terminal can be easier.

Design solution 2: A status of one of the M unit lengths is a redundant state, and is used to indicate that a unit length before or after the unit length is an effective unit length. In this case, step S103 may include that the terminal sequentially determines statuses of the M unit lengths. If one of the M unit lengths is a redundant unit length, the terminal determines that unit lengths before or after the unit length are the N effective unit lengths. The status of the unit length is used to indicate that the unit length is the effective unit length or the redundant unit length. In this manner, the terminal may not parse statuses of remaining (M−N−1) unit lengths.

Whether first N unit lengths or last N unit lengths in the M unit lengths are effective unit lengths may be preset, for example, may be preset using a protocol or using signaling. Further, if the first N unit lengths in the M unit lengths are preset to be effective unit lengths, the terminal sequentially determines the statuses of the M unit lengths in ascending order. If one of the M unit lengths is the redundant unit length, the terminal determines that all unit lengths before the unit length are the N effective unit lengths. If the last N unit lengths in the M unit lengths are preset to be effective unit lengths, the terminal sequentially determines the statuses of the M unit lengths in descending order. If one of the M unit lengths is the redundant unit length, the terminal determines that all unit lengths after the unit length are the N effective unit lengths.

For example, it is assumed that a unit length is an MCS field, and each MCS field occupies five bits. That is, there are a total of 32 possible statuses of information carried in the MCS field, and the 32 statuses may be represented as decimal numbers from 0 to 31 (including 0 and 31). In addition, 0 to 28 are preset to be effective states, and 29 to 31 are preset to be redundant states. In addition, first one or more unit lengths in the M unit lengths are preset to be effective unit lengths. In this case, if M=4, and the terminal learns, through parsing, that a status of the first unit length is 2 (which indicates that the first unit length is an effective unit length) and a status of the second unit length is 29 (which indicates that the status of the second unit length is a redundant unit length), the terminal determines that unit lengths before the second unit length are the N effective unit lengths, that is, N=1. The terminal may not parse remaining two unit lengths. That is, the remaining two unit lengths are redundant unit lengths by default.

It should be noted that, in some implementations, after determining the N effective unit lengths, the terminal may further sequentially determine whether one or more of the other (M−N−1) unit lengths are redundant unit lengths, to verify accuracy of the obtained N effective unit lengths. This improves transmission reliability of the N effective unit lengths.

It can be learned from the foregoing example that the terminal may not obtain the value of N before performing step S103. Certainly, the terminal may alternatively obtain the value of N before performing step S103. In this way, the terminal may verify the accuracy of the obtained N effective unit lengths according to the foregoing method. This improves the transmission reliability of the N effective unit lengths.

Design solution 3: N unit lengths at preset locations in the M unit lengths are effective unit lengths. In this case, step S103 may include that the terminal obtains a value of N, and then obtains the N effective unit lengths preset locations in the M unit lengths. For example, the network device indicates the value of N in the first control information, or indicates the value of N to the terminal using another piece of control information (for example, the other piece of control information includes but is not limited to the RRC signaling, the MAC signaling, or the DCI).

The preset location may be first one or more consecutive unit lengths, or last one or more consecutive unit lengths in the M unit lengths. In this way, N may be any value that is greater than or equal to 0 and less than M. Certainly, this application is not limited thereto. For example, the preset location may be one or more unit lengths obtained from the M unit length according to a specific rule, for example, an odd-numbered unit length or an even-numbered unit length. Which unit length in the M unit lengths is the preset location may be preset, for example, may be preset using a protocol or using signaling. It can be understood that a relative location of the preset location in the M unit lengths may be set when the preset location is preset, and it is unnecessary to set a quantity of unit lengths included in the preset location. That is, it is unnecessary to set the value of N.

For example, it is assumed that a unit length is an MCS field, and M=4. If the value of N obtained by the terminal is 2, and first one or more consecutive unit lengths in the M unit lengths are preset to be preset unit lengths, the terminal may use the first and second unit lengths in the four unit lengths as the preset unit lengths.

In this manner, the terminal determines the N effective unit lengths with reference to a preset location of an effective unit length in the M unit lengths and the value of N without a need of detecting a status of a unit length. Certainly, in some implementations, the terminal may verify accuracy of the obtained N effective unit lengths with reference to the value of N and statuses of one or more unit lengths in the M unit lengths. This improves transmission reliability of the N effective unit lengths.

In the first to the third technical solutions, information carried in the redundant unit length may be ineffective information, or certainly may be repeated information of the effective information, information that has a mapping relationship with the effective information, or the like. This is not limited in this application.

Design solution 4: Information carried in a plurality of unit length sets in the M unit lengths is the same or has a mapping relationship. The unit length set includes at least one unit length. In this case, step S103 may include, if the information carried in the plurality of unit length sets in the M unit lengths is the same or has the mapping relationship, unit lengths in any unit length set are used as the N effective unit lengths. For example, if the unit length is a field, and a plurality of field sets included in the first control information are used to carry same information, the plurality of field sets may include totally same content, or different field sets may have different offset values or initial values.

Each unit length set includes at least one unit length.

For example, assuming that the M unit lengths carry same information, it indicates that the unit length set includes one unit length, that is, N=1. In this case, any one of the M unit lengths may be used as the effective unit length, and another unit length is used as the redundant unit length. In some implementations, by determining information carried in another unit length, the terminal may alternatively verify accuracy of the determined effective unit length. This improves transmission reliability of the N effective unit lengths.

For example, assuming that a plurality of unit lengths in the M unit lengths carries same information, it indicates that the unit length set includes the plurality of unit lengths. The plurality of unit lengths may be a plurality of consecutive unit lengths, or may be a plurality of nonconsecutive unit lengths. For example, if the unit length is the MCS field, and M=6, information carried in the six MCS fields obtained by the terminal through parsing may be MCS 1, MCS 1, MCS 2, MCS 2, MCS 3, and MCS 3, or may be MCS 1, MCS 2, MCS 3, MCS 1, MCS 2, and MCS 3, or may be MCS 1, MCS 1, MCS 2, MCS 3, MCS 2, and MCS 3, or other forms. Two groups of {MCS 1, MCS 2, and MCS 3} are obtained through parsing in each form, that is, N=3. In this case, any three unit lengths that indicate {MCS 1, MCS 2, and MCS 3} may be used as effective unit lengths. In this example, the unit length set includes the three unit lengths.

It should be noted that an example in which M is an integer multiple of N is used to describe the foregoing two examples. Alternatively, M may not be an integer multiple of N during actual implementation. In addition, in this technical solution, information carried in the redundant unit length is repeated information of effective information, information that has a mapping relationship with the effective information, or the like.

In this manner, the terminal does not need to distinguish whether a status of a unit length is an effective state or a redundant state. Optionally, the status of each of the M unit lengths is the effective state. That is, the terminal does not determine, by determining the status of the unit length, whether the unit length is an effective unit length or a redundant unit length, and instead, the terminal determines the N effective unit lengths by determining the information carried in the unit length. In addition, the terminal may use other (M−N) unit lengths as redundant unit lengths.

Figure 3:
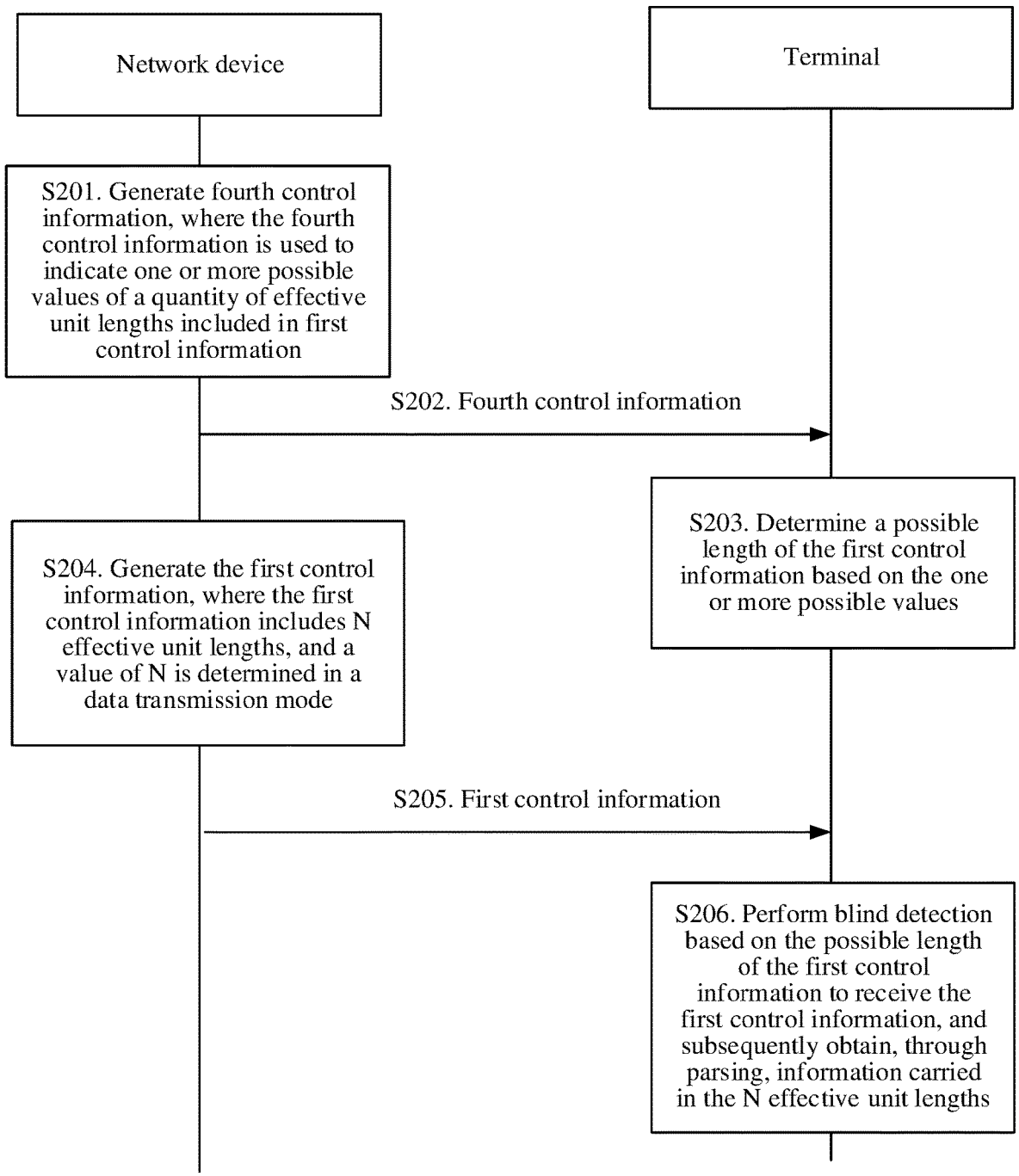
FIG. 3 is a schematic interaction diagram of another control information transmission method according to an embodiment of this application.

FIG. 3 is a schematic interaction diagram of another control information transmission method according to this application.

Step S201. A network device generates fourth control information, where the fourth control information is used to indicate one or more possible values of a quantity of effective unit lengths included in first control information.

The fourth control information may be, for example, but is not limited to, RRC signaling, MAC signaling, or DCI.

A blind detection capability of a terminal is limited. Further, the limitation may be reflected as a limited total quantity of blind detection times. For example, as described above, a maximum quantity of blind detection times required for detecting DCI in one length is 22. It can be learned from this that a maximum quantity of blind detection times required for detecting DCI in R lengths is 22R, where R is an integer greater than or equal to 1. In this embodiment, the fourth control information indicates a value of a quantity of effective unit lengths included in the first control information, that is, indicates a type of a length of the first control information. First control information in a same length belongs to one type, and first control information in different lengths belongs to different types. In this way, it is helpful to control an actual quantity of blind detection times of the terminal within the blind detection capability of the terminal.

Step S202. The network device sends the fourth control information, and the terminal receives the fourth control information.

Step S203. The terminal determines a possible length of the first control information based on the one or more possible values.

Step S204. The network device generates the first control information, where the first control information includes N effective unit lengths, a value of N is determined in a data transmission mode, N≥0, and N is an integer.

N in step S204 is one of the one or more possible values in step S201, and may be determined in the data transmission mode. For example, the data transmission mode may include without limitation to at least one of a quantity of data layers, a quantity of code words, a quantity of antenna ports, a quantity of beams, a quantity of transmission points, a quantity of repetitions, a quantity of retransmission times, a data transmission mode, and the like. A plurality of code words is used as an example. If two code words are scheduled in one piece of DCI, and the two code words need to have transmission parameters independent with each other, for example, have different MCSs, RVs or NDIs, a quantity of each of the transmission parameters needs to be two, that is, two MCS fields, two RV fields, or two NDI fields are required.

It should be noted that N is one of the one or more possible values in step S201. That is, a quantity of effective lengths included in the first control information cannot be randomly obtained. Based on this, assuming that the value of N determined by the network device in the data transmission mode is not one of the one or more possible values in step S201, an optional implementation is an actual value of N is a minimum value that is in the one or more possible values and that is greater than the value of N determined in the data transmission mode. In this case, for a design manner of the first control information, refer to any one of the embodiments described above. This embodiment herein is used in combination of the foregoing embodiment and this embodiment. Certainly, this application is not limited thereto. In principle, some or all of features in any quantity of embodiments of this application may be used in combination without a conflict, to constitute a new embodiment. Other examples are not enumerated one by one in this application.

Step S205. The network device sends the first control information, and the terminal receives the first control information.

An execution sequence of steps S203, S204, and S205 is not limited in this application. For example, step S203 may be performed before steps S204 and S205, steps S204 and S205 may be performed before step S203, or steps S203, S204, and S205 may be performed simultaneously.

Step S206. The terminal performs blind detection based on the possible length of the first control information to receive the first control information, and subsequently the terminal may obtain, through parsing, information carried in the N effective unit lengths of the first control information, and perform a corresponding control operation based on the information.

In this embodiment, the fourth control information indicates the possible value of the quantity of effective unit lengths included in the first control information. In this way, it is helpful to control an actual quantity of blind detection times of the terminal within the blind detection capability of the terminal. For an analysis process, refer to the foregoing descriptions. Details are not described herein again.

Figure 4:
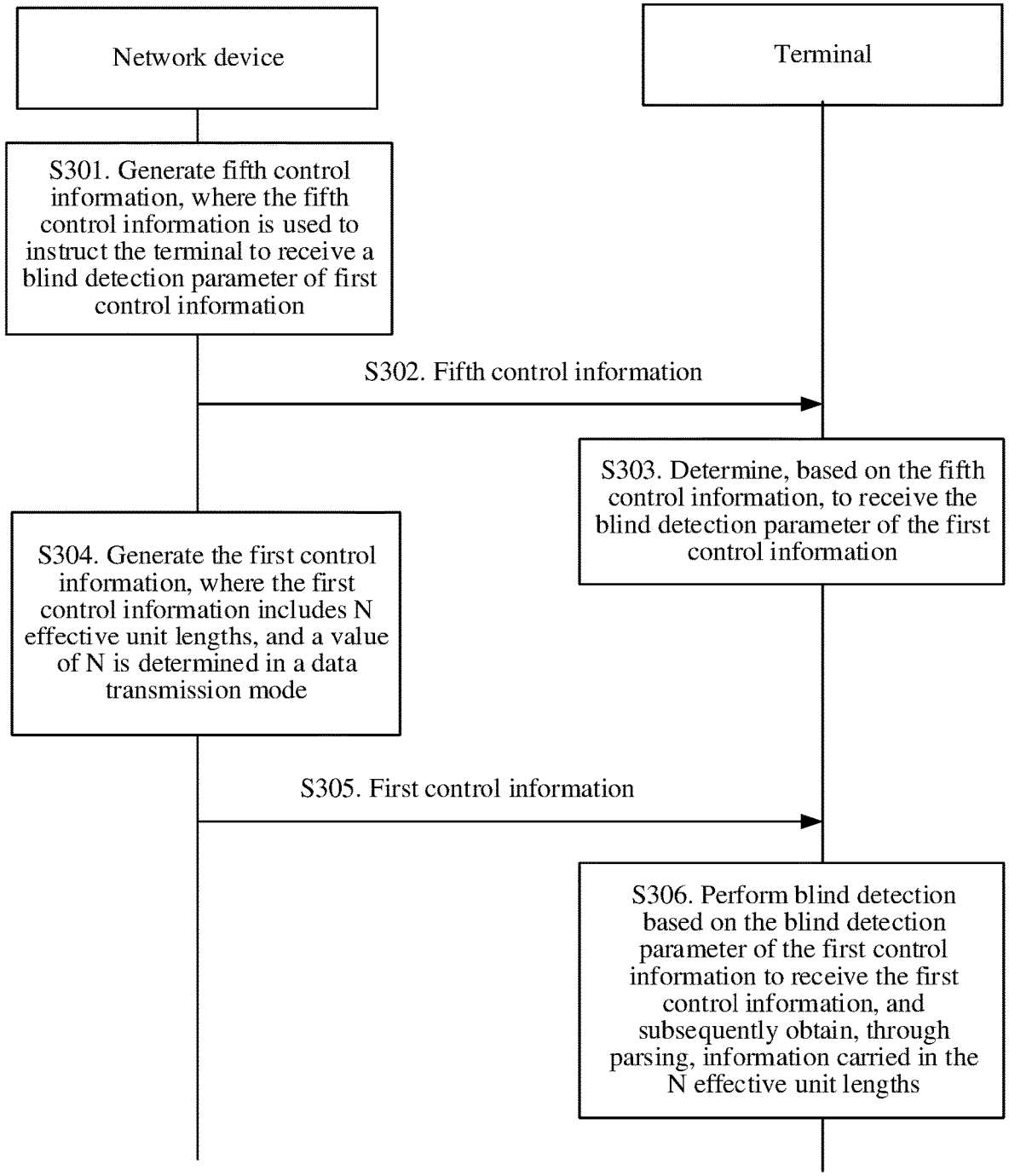
FIG. 4 is a schematic interaction diagram of another control information transmission method according to an embodiment of this application.

FIG. 4 is a schematic interaction diagram of another control information transmission method according to this application.

Step S301. A network device generates fifth control information, where the fifth control information is used to instruct a terminal to receive a blind detection parameter of first control information.

The fifth control information may be, for example, but is not limited to, RRC signaling, MAC signaling, or DCI.

The blind detection parameter of the first control information may include, for example without limitation to, at least one of a length of the first control information (that is, one or more possible lengths of the first control information), a time-frequency resource location (that is, one or more possible time-frequency resource locations of the first control information), and an AL (that is, one or more possible ALs of a control unit carrying the first control information), a quantity of carriers, a quantity of beams, a quantity of transmission points, a quantity of resource sets, a quantity of bandwidths, and the like.

Information carried in the fifth control information is not limited in this application. For example, the fifth control information may carry an index of a search space, to indicate a possible time-frequency resource location of the first control information. Other examples are not enumerated one by one.

Step S302. The network device sends the fifth control information, and the terminal receives the fifth control information.

Step S303. The terminal determines, based on the fifth control information, to receive the blind detection parameter of the first control information.

Step S304. The network device generates the first control information, where the first control information includes N effective unit lengths, a value of N is determined in a data transmission mode, N≥0, and N is an integer.

Step S305. The network device sends the first control information, and the terminal receives the first control information.

An execution sequence of steps S303, S304, and S305 is not limited in this application. For example, step S303 may be performed before steps S304 and S305, steps S304 and S305 may be performed before step S303, or steps S303, S304, and S305 may be performed simultaneously.

Step S306. The terminal performs blind detection based on the blind detection parameter of the first control information to receive the first control information, and subsequently the terminal may obtain, through parsing, information carried in the N effective unit lengths of the first control information, and perform a corresponding control operation based on the information.

For description of related content in this embodiment, refer to the foregoing descriptions. Details are not described herein again.

In this embodiment, the fifth control information is used to indicate the blind detection parameter of the first control information. It can be learned with reference to Table 1 above that this helps control an actual quantity of blind detection times of the terminal within the blind detection capability of the terminal.

The foregoing mainly describes the solutions provided in the embodiments of this application from a perspective of interaction between network elements. It may be understood that each network element is, for example, a network device or a terminal. To implement the foregoing functions, the network elements include corresponding hardware structures and/or software modules for performing functions. A person skilled in the art should easily be aware that, in combination with the examples described in the embodiments disclosed in this specification, units, and algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, functional modules of the network device or the terminal may be divided based on the foregoing method example. For example, each function module may be divided according to corresponding functions, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used. The following describes an example in which each function module is obtained through division based on each corresponding function.

Figure 5:
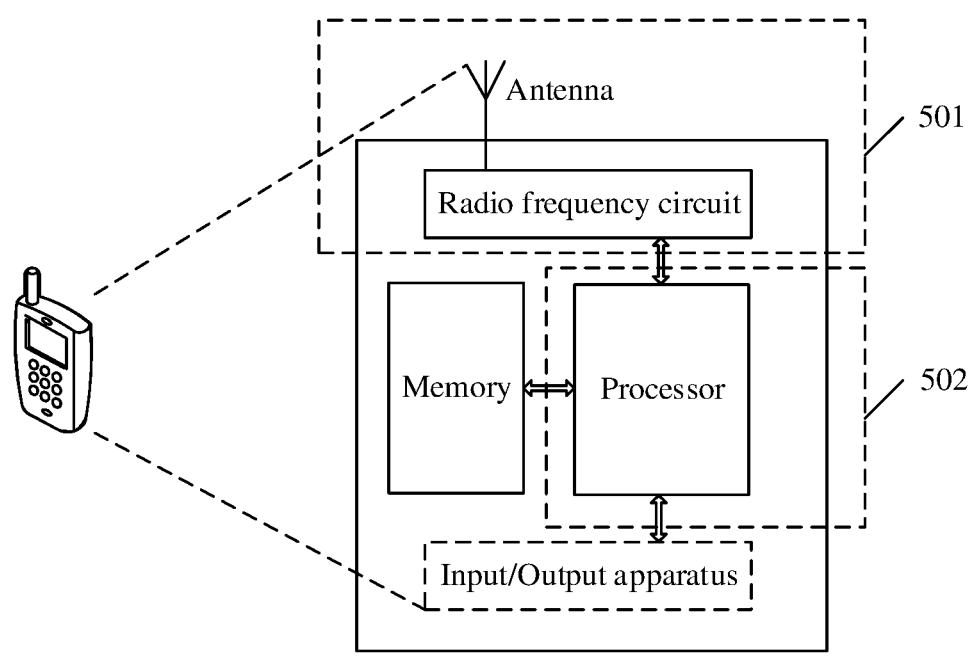
FIG. 5 is a simplified schematic structural diagram of a terminal according to an embodiment of this application.

An embodiment of this application further provides a terminal. The terminal may be used to perform the steps performed by the terminal in any one of FIG. 2 to FIG. 4. FIG. 5 is a simplified schematic structural diagram of a terminal. For ease of understanding and illustration, in FIG. 5, a mobile phone is used as an example of the terminal. As shown in FIG. 5, the terminal includes a processor, a memory, a radio frequency circuit, an antenna, and an input/output apparatus. The processor is mainly configured to process a communication protocol and communication data, control the terminal, execute a software program, process data of a software program, and the like. The memory is mainly configured to store the software program and the data. The radio frequency circuit is mainly configured to perform conversion between a baseband signal and a radio frequency signal, and process the radio frequency signal. The antenna is mainly configured to receive and send a radio frequency signal in an electromagnetic wave form. The input/output apparatus such as a touchscreen, a display, or a keyboard is mainly configured to receive data entered by a user, and output data to the user. It should be noted that some types of terminals may not have an input/output apparatus.

When data needs to be sent, after performing baseband processing on to-be-sent data, the processor outputs a baseband signal to the radio frequency circuit. After performing radio frequency processing on the baseband signal, the radio frequency circuit sends a radio frequency signal in an electromagnetic wave form through the antenna. When data is sent to the terminal, the radio frequency circuit receives the radio frequency signal through the antenna, converts the radio frequency signal into a baseband signal, and outputs the baseband signal to the processor. The processor converts the baseband signal into data, and processes the data. For ease of description, only one memory and one processor are shown in FIG. 5. An actual terminal product may have one or more processors and one or more memories. The memory may also be referred to as a storage medium, a storage device, or the like. The memory may be disposed independent of the processor, or may be integrated with the processor. This is not limited in the embodiment of this application.

In this embodiment of this application, an antenna and a radio frequency circuit that have receiving and sending functions may be considered as a transceiver unit of the terminal, and a processor that has a processing function may be considered as a processing unit of the terminal. As shown in FIG. 5, the terminal includes a transceiver unit 501 and a processing unit 502. The transceiver unit 501 may also be referred to as a transceiver, a transceiver machine, a transceiver apparatus, or the like. The processing unit 502 may also be referred to as a processor, a processing board, a processing module, a processing apparatus, or the like. Optionally, a component configured to implement a receiving function in the transceiver unit 501 may be considered as a receiving unit, and a component configured to implement a sending function in the transceiver unit 501 may be considered as a sending unit. That is, the transceiver unit 501 includes the receiving unit and the sending unit. The transceiver unit 501 may also be sometimes referred to as a transceiver machine, a transceiver, a transceiver circuit, or the like. The receiving unit may also be sometimes referred to as a receiving machine, a receiver, a receiving circuit, or the like. The sending unit may also be sometimes referred to as a transmitter machine, a transmitter, a transmitting circuit, or the like.

For example, in an implementation, the transceiver unit 501 is configured to perform the steps performed by the terminal in step S102 in FIG. 2, and/or other steps in this application. The processing unit 502 is configured to perform steps S103 and S104 in FIG. 2, and/or related steps in this application.

For example, in an implementation, the transceiver unit 501 is configured to perform the steps performed by the terminal in steps S201 and S205 in FIG. 3, and/or other steps in this application. The processing unit 502 is configured to perform steps S203 and S206 in FIG. 3, and/or other steps in this application.

For example, in an implementation, the transceiver unit 501 is configured to perform the steps performed by the terminal in steps S302 and S305 in FIG. 4, and/or other steps in this application. The processing unit 502 is configured to perform steps S303 and S306 in FIG. 4, and/or other steps in this application.

Figure 6:
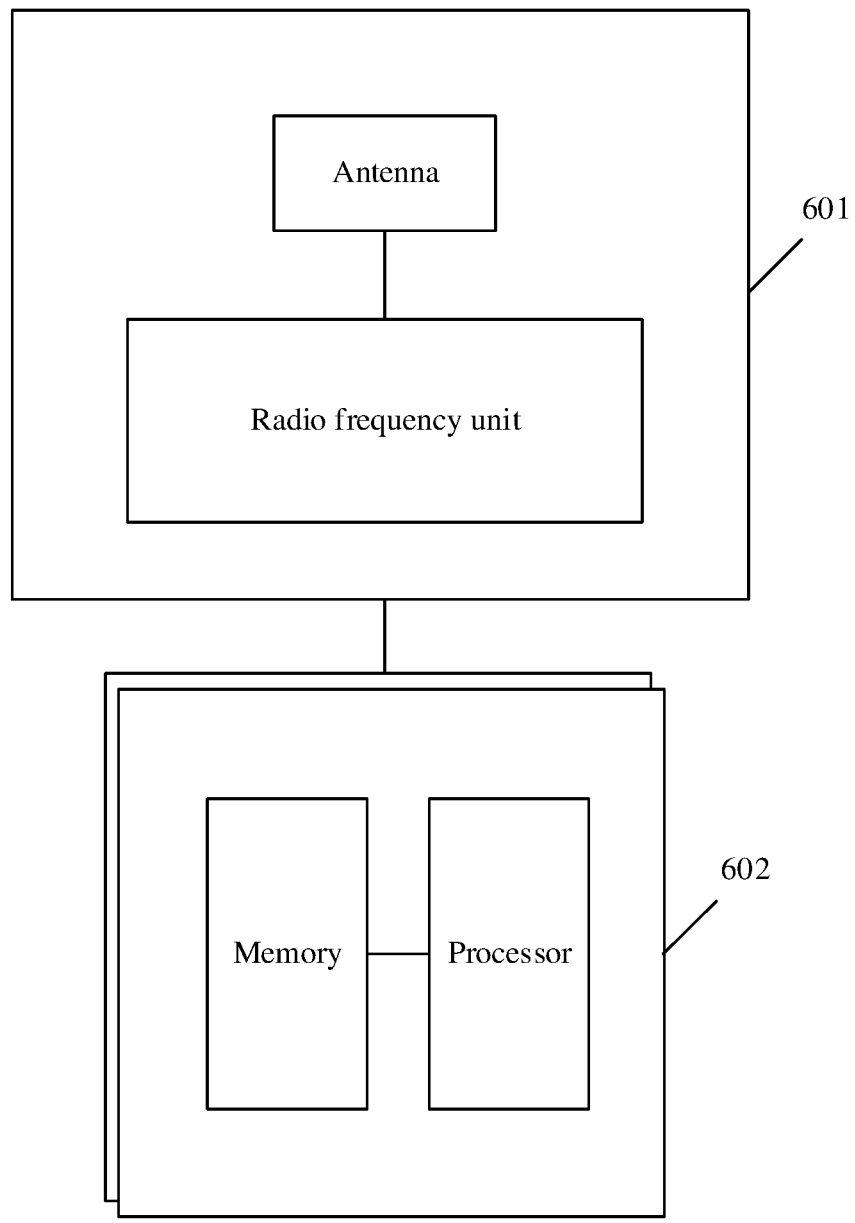
FIG. 6 is a simplified schematic structural diagram of a network device according to an embodiment of this application.

An embodiment of this application further provides a network device, for example, a base station. FIG. 6 is a simplified schematic structural diagram of a base station. The base station includes a part 601 and a part 602. The part 601 is mainly used for sending and receiving of a radio frequency signal and converting of the radio frequency signal and a baseband signal. The part 602 is mainly used for processing of the baseband signal, controlling the base station, and the like. The part 601 may be usually referred to as a transceiver unit, a transceiver machine, a transceiver circuit, a transceiver, or the like. The part 602 is usually a control center of the base station, and may be usually referred to as a processing unit configured to control the base station to perform the steps performed by the base station (that is, a serving base station) in FIG. 6. For details, refer to descriptions of the foregoing related parts.

A transceiver unit in the part 601 may also be referred to as a transceiver machine, a transceiver, or the like, and includes an antenna and a radio frequency unit. The radio frequency unit is mainly configured to perform radio frequency processing. Optionally, a component for implementing a receiving function in the part 601 may be considered as a receiving unit, and a component for implementing a sending function may be considered as a sending unit. That is, the part 601 includes the receiving unit and the sending unit. The receiving unit may also be referred to as a receiving machine, a receiver, a receiving circuit, or the like. The sending unit may also be referred to as a transmitter machine, a transmitter, a transmitting circuit, or the like.

The part 602 may include one or more boards. Each board may include one or more processors and one or more memories, and the processor is configured to read and execute a program in the memory, to implement a baseband processing function and control the base station. If there is a plurality of boards, the boards may be interconnected to improve a processing capability. In an optional implementation, a plurality of boards may share one or more processors, or a plurality of boards may share one or more memories, or a plurality of boards may share one or more processors at the same time.

For example, in an implementation, the transceiver unit is configured to perform the steps performed by the network device in step S102 in FIG. 2, and/or other steps in this application. The processing unit is configured to perform step S101 in FIG. 2, and/or related steps in this application.

For example, in an implementation, the transceiver unit is configured to perform the steps performed by the network device in steps S201 and S205 in FIG. 3, and/or other steps in this application. The processing unit is configured to perform steps S201 and S204 in FIG. 3, and/or other steps in this application.

For example, in an implementation, the transceiver unit is configured to perform the steps performed by the network device in steps S302 and S305 in FIG. 4, and/or other steps in this application. The processing unit is configured to perform steps S301 and S304 in FIG. 4, and/or other steps in this application.

For explanations and beneficial effects of related content in any one of the foregoing provided communications apparatuses, refer to the corresponding method embodiments provided above. Details are not described herein again.

All or some of the foregoing embodiments may be implemented by means of software, hardware, firmware, or any combination thereof. When a software program is used to implement the embodiments, the embodiments may be implemented all or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, definitely, various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. Definitely, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method implemented by a terminal, the method comprising:

receiving, via a physical downlink control channel from a network device communicatively coupled to the terminal, first downlink control information, wherein the first downlink control information comprises M fields comprising one or more bits, wherein N effective fields of the M fields are set as effective fields, wherein $0 \leq N < M$, wherein both M and N are integers, and wherein M−N fields of the M fields are redundant fields;

obtaining the N effective fields by:
determining a status of each of the M fields, wherein the status of each of the M fields indicates whether a corresponding field is an effective field or a redundant field;
sequentially determining statuses of the M fields, and determining, in response to a field of the M fields being determined to be the redundant field, that fields before or after the field are the N effective fields; or
determining a value of N, and obtaining the N effective fields at preset locations in the M fields; and determining information carried in the N effective fields, wherein the information enables an apparatus to perform a corresponding control operation.

2. The method of claim 1, further comprising receiving second control information, wherein the second control information indicates the value of N.

3. The method of claim 1, further comprising receiving third control information, wherein the third control information indicates a value of M.

4. The method of claim 1, further comprising parsing only the N effective fields.

5. The method of claim 1, wherein obtaining the N effective fields comprises determining the status of each of the M fields.

6. The method of claim 1, wherein obtaining the N effective fields comprises:
sequentially determining the statuses of the M fields; and
determining, in response to the field of the M fields being determined to be the redundant field, that the fields before or after the field are the N effective fields.

7. The method of claim 1, wherein obtaining the N effective fields comprises:
determining the value of N; and
obtaining the N effective fields at the preset locations in the M fields.

8. A method implemented by a network device, the method comprising:

generating first downlink control information, wherein the first downlink control information comprises M fields, wherein N fields of the M fields are set as effective fields, wherein $0 \leq N < M$, wherein both M and N are integers, and wherein M−N fields of the M fields comprise redundant information; and
sending, via a physical downlink control channel, the first downlink control information to a terminal communicatively coupled to the network device,
wherein a status of each of the M fields indicates that a corresponding field is an effective field or a redundant field, a status of a field of the M fields is a redundant state and indicates that fields before or after the field are the effective fields, or the N fields at preset locations in the M fields are the effective fields.

9. The method of claim 8, further comprising sending second control information, wherein the second control information indicates a value of N.

10. The method of claim 8, further comprising sending third control information, wherein the third control information indicates a value of M.

11. A terminal comprising:
a storage medium configured to store executable instructions; and
a processor coupled to the storage medium, wherein the executable instructions, when executed by the processor, cause the terminal to:
receive, via a physical downlink control channel from a network device communicatively coupled to the terminal, first downlink control information, wherein the first downlink control information comprises M fields comprising one or more bits, wherein N effective fields of the M fields are set as effective fields, wherein $0 \leq N < M$, wherein both M and N are integers, and wherein M−N fields of the M fields are redundant fields;
obtain the N effective fields by:
determining a status of each of the M fields, wherein the status of each of the M fields indicates whether a corresponding field is an effective field or a redundant field;
sequentially determining statuses of the M fields, and determining, in response to a field of the M fields being determined to be the redundant field, that fields before or after the field are the N effective fields; or
determining a value of N, and obtaining the N effective fields at preset locations in the M fields; and
determine information carried in the N effective fields, wherein the information enables the terminal to perform a corresponding control operation.

12. The terminal of claim 11, wherein the executable instructions further cause the terminal to receive second control information, and wherein the second control information indicates the value of N.

13. The terminal of claim 11, wherein the executable instructions further cause the terminal to receive third control information, and wherein the third control information indicates a value of M.

14. The terminal of claim 11, wherein the executable instructions further cause the terminal to parse only the N effective fields.

15. The terminal of claim 11, wherein each field of the M fields carries a same type of information as each other field of the M fields, and wherein the same type of information is a modulation and coding scheme, a new data indicator, a redundancy version, resource information, antenna information, coordinated multipoint transmission/reception information, hybrid automatic repeat request information, a reference signal indicator, power control information, a measurement trigger, a multi-carrier indicator, timing information, or an initial access parameter.

16. A network device comprising:
a storage medium configured to store executable instructions; and
a processor coupled to the storage medium, wherein the executable instructions, when executed by the processor, cause the network device to:
generate first downlink control information comprising M fields, wherein N fields of the M fields are effective fields, wherein $0 \leq N < M$, wherein both M and N are integers, and wherein M−N fields of the M fields comprise redundant information; and
send, via a physical downlink control channel, the first downlink control information to a terminal communicatively coupled to the network device,
wherein a status of each of the M fields indicates that a corresponding field is an effective field or a redundant field, a status of a field of the M fields is a redundant state and indicates that fields before or after the field are the effective fields, or the N fields at preset locations in the M fields are the effective fields.

17. The network device of claim 16, wherein the executable instructions further cause the network device to send second control information that indicates a value of N.

18. The network device of claim 16, wherein the executable instructions further cause the network device to send third control information that indicates a value of M.

19. The network device of claim 16, wherein each field of the M fields carries power control information.

20. The network device of claim 16, wherein each field of the M fields carries a same type of information as each other field of the M fields, and wherein the same type of information is a modulation and coding scheme, a new data indicator, a redundancy version, resource information, antenna information, coordinated multipoint transmission/reception information, hybrid automatic repeat request information, a reference signal indicator, a measurement trigger, a multi-carrier indicator, timing information, or an initial access parameter.

* * * * *